United States Patent
Broberg

(10) Patent No.: US 9,631,245 B2
(45) Date of Patent: Apr. 25, 2017

(54) SUGAR MELTING

(71) Applicant: Tetra Laval Holdings & Finance S.A., Pully (CH)

(72) Inventor: Lars Broberg, Jonstorp (CH)

(73) Assignee: TETRA LAVAL HOLDINGS & FINANCE S.A, Pully (CH)

( * ) Notice: Subject to any disclaimer, the term of this patent is extended or adjusted under 35 U.S.C. 154(b) by 14 days.

(21) Appl. No.: 14/418,505

(22) PCT Filed: Jul. 29, 2013

(86) PCT No.: PCT/EP2013/065910
§ 371 (c)(1),
(2) Date: Jan. 30, 2015

(87) PCT Pub. No.: WO2014/019985
PCT Pub. Date: Feb. 6, 2014

(65) Prior Publication Data
US 2015/0184258 A1    Jul. 2, 2015

(30) Foreign Application Priority Data
Aug. 1, 2012 (SE) .................................. 1250905

(51) Int. Cl.
| | |
|---|---|
| *A23L 1/09* | (2006.01) |
| *C13B 50/00* | (2011.01) |
| *C13B 20/16* | (2011.01) |
| *C13B 10/10* | (2011.01) |
| *C13B 10/02* | (2011.01) |
| *A23L 29/30* | (2016.01) |

(52) U.S. Cl.
CPC .............. *C13B 20/165* (2013.01); *A23L 29/32* (2016.08); *C13B 10/02* (2013.01); *C13B 10/10* (2013.01); *C13B 20/16* (2013.01); *C13B 50/00* (2013.01)

(58) Field of Classification Search
CPC ....... A23L 1/092; A23L 29/32; C13B 20/165; C13B 50/00; C13B 10/10; C13B 20/16; C13B 10/02
See application file for complete search history.

(56) References Cited

U.S. PATENT DOCUMENTS

| | | |
|---|---|---|
| 2,976,189 A | 3/1961 | Alston |
| 4,063,960 A | 12/1977 | Paley |
| 7,910,341 B1 | 3/2011 | McClune |

FOREIGN PATENT DOCUMENTS

| | | |
|---|---|---|
| BE | 806458 A1 | 2/1974 |
| BE | 860875 A1 | 3/1978 |

(Continued)

OTHER PUBLICATIONS

International Preliminary Report on Patentability for PCT/EP2013/065910, mailed on Feb. 3, 2015.*

(Continued)

*Primary Examiner* — David A Reifsnyder
(74) *Attorney, Agent, or Firm* — Buchanana Ingersoll & Rooney PC

(57) ABSTRACT

An arrangement for melting and cleaning a substance, such as natural sugar. The arrangement comprises a mesh belt for transporting the substance through a heating station for heating the substance so that a dissolved phase of the substance is separated from impurities in the substance through the mesh of the mesh belt substantially simultaneously.

6 Claims, 2 Drawing Sheets

(56) References Cited

FOREIGN PATENT DOCUMENTS

FR   2404673 A1   4/1979
GB   1048326 A   11/1966

OTHER PUBLICATIONS

International Search Report (PCT/ISA/210) mailed on Oct. 16, 2013, by the European Patent Office as the International Searching Authority for International Application No. PCT/EP2013/065910.

\* cited by examiner

SUGAR MELTING

TECHNICAL FIELD

This application relates to a process and an apparatus for improved dissolving sap collected substances, and in particular to a process and an apparatus for dissolving natural sugars, such as coconut sugar.

BACKGROUND

Coconut sugar (also known as coco sugar, coconut palm sugar or coco sap sugar) is a sugar produced from the sap of cut flower buds of the coconut palm. Coconut sugar has been used as a traditional sweetener for thousands of years in the South and South-East Asian regions where the coconut palm is in abundant supply. The world's largest producer of coconut is the Philippines and Indonesia.

In some areas, predominantly in Thailand, the terms "coconut sugar" and "palm sugar" are often used interchangeably. However, coconut sugar is different both in taste, texture and manufacture methods from palm sugar, which is made from the sap in the stems of the Palmyra palm, the date palm, the sugar date palm, the sago palm or the sugar palm.

Coconut sugar comes in crystal or granule form, block or liquid. It is essentially a two-step process. It starts with harvesting or "tapping" the blossoms of a coconut tree. Farmers make a cut on the spadix and the sap starts to flow from the cut. The sap is then collected in bamboo containers. The sap collected is then transferred into giant woks and placed over moderate heat to evaporate the moisture content of the sap. The sap is translucent and is about 80% water. As the water evaporates, it starts to transform into a thick syrup-like substance known as a "toddy". From this form, it is further reduced to crystal, block or soft paste form, or it remains in this form. Essentially, coconut sugar's form depends on the moisture content of the toddy.

FIG. 1 shows a schematic overview of a sap harvesting and collecting process 1 for producing the toddy. The process is described for collecting coconut sap, but is applicable to collecting also other kinds of sap.

The process is a traditional process that has existed for many decades. It involves two basic steps, the first being a collection step (referenced COLLECTION in FIG. 1) in which the sap from the blossoms (flowers) is harvested, which is also known as "tapping" the tree. Harvesting the sap or "tapping" the tree involves making a cut on the spadix of the coconut. Once the tree is tapped, the coconut sap start to flow from the cut and is collected typically in bamboo containers. This operation is repeated for many days successively to "freshen the cut". The sap continues to flow for about 30 to 40 days from this single spadix but some species have been reported to produce sap for as long as 60 days. The volume of the sap can vary depending to the age of the tree, location, variety of the tree and its general condition. On the average though, a single coconut tree can produce about 288 liters per year. A coconut tree can be tapped for a whole year but it is typically given a rest period of 3 to 4 months per year with some farmers even giving the tree an entire year rest period.

The second step (referenced EVAPORATE in FIG. 1) is to evaporate the moisture from the collected sap. The freshly collected sap is transferred in giant woks or other containers and placed under moderate heat. The sap that is to be used for sugar making process has to be un-fermented sap with a pH level of 5.9 or higher. It is crucial to use fresh sap because the sap starts to ferment as it ages making it useless for sugar-making. The evaporation therefore takes place in close proximity to the collection location. Especially in less developed countries, where transport can often be a slow process. In such countries both the evaporation and any intermittent storage is thus under primitive circumstances in rural environments and subjected to introduce debris, animals, leaves and other impurities. Such impurities are also introduced during the collection step, which is also performed under primitive circumstances in rural environments.

The sap is about 80% water, 15% sugar, and 5% other minerals so heat is used to evaporate the water. Under the heat, a foam starts to float to the top. This foam called a "scum", is removed as these scum are nitrogenous materials that can cause further fermentation rendering the sap useless for sugar production. As more water evaporates, the sap starts to change color and form from a translucent liquid to a dark brown syrup-like substance. The toddy will then contain both the sugar syrup as well as the impurities. The toddy is the form delivered to the factories where the toddy is further treated, for example by being dehydrated, resulting in the different forms of coconut sugar we see today. Coconut sugar is sold in syrup, hard blocks, soft paste or crystallized form. The form essentially depends on the moisture content of the toddy. The lesser the moisture content, the harder the coconut sugar.

Prior to the he further treatment the impurities need to be removed which is achieved by a series of steps of dissolving, also called melting, the sugar in batches and then manually or at least mechanically sieving it (referenced MELTING & SIEVING in FIG. 1) wherein the sugar is retained in liquid form and the impurities are filtered out or removed, resulting in a sugar quality appropriate for crystallization or other further treatment. The sieving often has to be repeated in several steps to allow for a resulting sugar of a high quality.

The same basic process can be and is used for collection process for other natural components collected from the sap of various trees, especially in less developed countries. One example being the collection of maple sap for producing maple syrup.

This process thus suffers from that the sugar has to be manually sieved and treated in batches which require multiple steps to be taken and which is performed in batches preventing succeeding steps to be performed continuously.

A further drawback of the traditional process is that it essentially involves a boiling of the toddy through which the impurities may add characteristics to the sugar, thereby tainting the taste of the resulting sugar products.

There is thus a need for an improved manner of separating the impurities from the toddy that allows for a continuous production cycle.

SUMMARY

It is an object of the teachings of this application to overcome the problems listed above by providing an arrangement for melting and purifying a substance, such as natural sugar, said arrangement comprising a mesh belt for transporting said substance through a heating station for heating said substance so that a dissolved phase of said substance is separated from impurities in said substance through the mesh of said mesh belt. The separating and heating is performed substantially simultaneously and also continuously which provides for an improved handling and processing of the substance. In one embodiment the substance is a toddy for processing of natural sugar.

It is also an object of the teachings of this application to overcome the problems listed above by providing a process for melting and purifying a product, such as sugars derived from sap or nectar, said method comprising: receiving said substance and placing it on a mesh belt, transporting said substance through a heating station thereby heating said substance and separating a dissolved phase of said substance from impurities in said substance through the mesh of said mesh belt.

It is also an object of the teachings of this application to overcome the problems listed above by providing a use of a mesh belt for heating and substantially simultaneous separating a dissolved phase of a substance from impurities in said substance through the mesh of said mesh belt.

It is also an object of the teachings of this application to overcome the problems listed above by providing a natural sugar produced according to a process according to above.

The inventors of the present invention have realized, after inventive and insightful reasoning, that by utilizing a mesh belt for transporting a toddy through a heating station simultaneous melting and separation of the toddy from impurities is achieved that can be performed continuously providing many advantages for automated processing and also other processing.

The teachings herein find use in processing of natural sugars, more specifically sugars derived from sap or nectar, but also for processing of other substances that are to be dissolved and purified or cleaned from impurities.

The teachings herein enables high efficient processing of sugar products in areas of low developed technology.

An arrangement and a process according to the teachings herein can beneficially be used in and integrated into the production Ketjap Manis and like products, the teachings herein being combined with other processes and arrangements enabling such production.

Other features and advantages of the disclosed embodiments will appear from the following detailed disclosure, from the attached dependent claims as well as from the drawings.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF DRAWINGS

The invention will be described in further detail under reference to the accompanying drawings in which.

DETAILED DESCRIPTION

The disclosed embodiments will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art Like numbers refer to like elements throughout.

Figure 1:
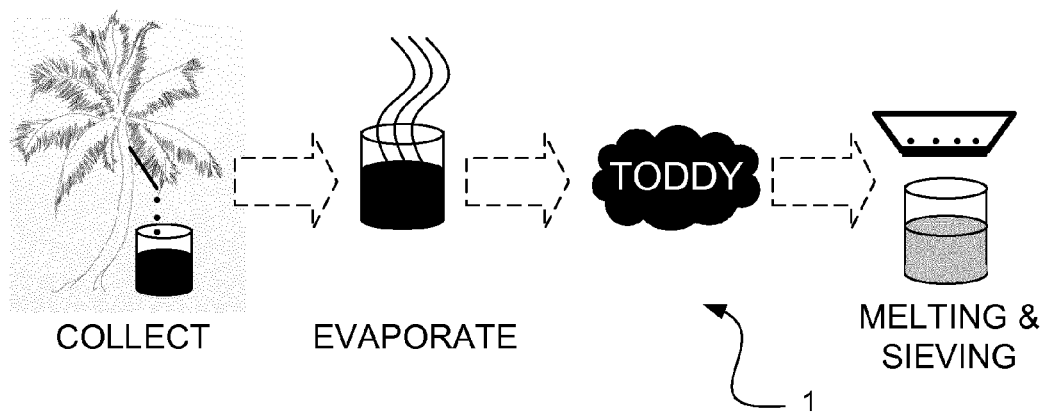
FIG. 1 shows a schematic view of a sap harvesting and collecting process.
Figure 2:
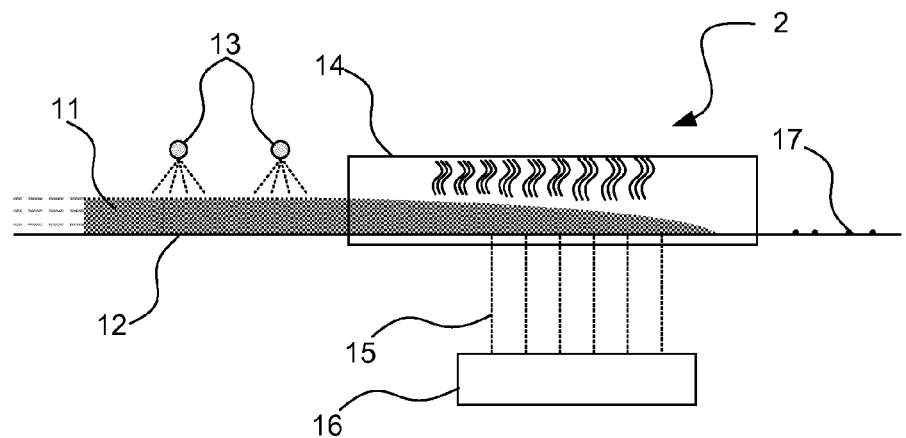
FIG. 2 shows a schematic view of an arrangement for a general process according to an embodiment of the teachings herein.

At least one embodiment of an arrangement and a method according to the teachings herein will be described with simultaneous reference to FIG. 2, which shows a schematic view of an arrangement for a general process according to an embodiment of the teachings herein, and FIG. 4, which shows a schematic illustration of a process according to an embodiment of the teachings herein. The arrangement 2 is arranged to receive (referenced 410 in FIG. 4) a mass of so-called toddy 11 on a mesh belt 12 (placing the toddy on the mesh belt 12 is referenced 420 in FIG. 4) and to transport the toddy 11 on the mesh belt 12 through a heating station (referenced 430 in FIG. 4). In the embodiment of FIG. 2, the heating station is comprised of one or more steam dispensers 13 arranged to heat the toddy 11 by dispensing water or brine steam on the toddy 11 followed by an oven 14 for heating the toddy 11 by supplying an indirect heat source, such as an arrangement for infrared radiation or microwaves to name a few. The oven 14 can thus be interchanged with any other indirect heat source. In one embodiment the steam dispenser 13 may be replaced with nozzles for spraying hot water or brine over the toddy 11. In such an embodiment, steam may be generated indirectly from the water, possibly in the oven 14.

It should be noted that the heating station, although having been disclosed as having two substations, may be implemented as a single station or with additional stations. For example, the heating station can be implemented with only a (series of) steam dispenser(s) 13 or only an oven 14. Also, the heating station can be implemented as a (series of) steam dispenser(s) 13 followed by an oven 14 and a source of infra red radiation.

Figure 4:
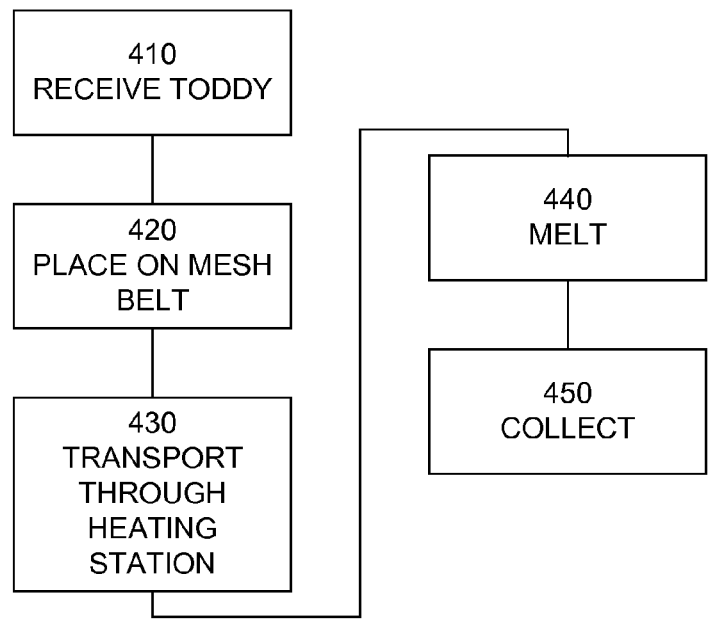
FIG. 4, which shows a schematic illustration of a process according to an embodiment of the teachings herein.

The heating station is arranged to heat the toddy 11 so that the sugar content melts (or dissolves) (referenced 440 in FIG. 4). As it melts into a liquid form, the sugar content will run, sip or drip, indicated with reference 15 in FIG. 2, through the mesh in the mesh belt 12 to be collected (referenced 450 in FIG. 4) in a collection tray 16. In one embodiment the collection tray 16 is heated to retain the sugar content in a melted form. It should be noted that even though the collection tray 16 is illustrated and disclosed as a tray it can also be implemented through a conduit or other transport means for transport to further processing stations such as crystallization stations, caramelization stations, concentration stations and/or drying/dehydrating stations. The transport can be achieved by another belt, by pumping or possibly also further sieving. The remaining impurities 17 are transported by the mesh belt 12 to be disposed of properly at a disposal station (not shown).

The water or brine supplied by the steam dispensers serve two main purposes, the first being to dilute the sugar content to a desired brix count. The amount of brine or water added naturally affects the brix count for the retained sugar solution. The more brine that is added, the lower the brix count is. At the same time, the steam dispensers 13 provide for a highly efficient heating of the toddy 11. This necessitates a compromise to be made in the production process between the desired brix count and the efficiency of the heating station. The amount of brine added is dependent on the flow of the brine through the steam dispensers 13 and the time that the toddy 11 is exposed to the steam dispensers 13. In one embodiment the time that the toddy 11 is exposed to the steam dispensers 13 is set to 5 to 10 minutes, depending on the desired brix count.

The second purpose of adding the brine is to further effectuate the heat transfer between the heat station and the toddy 11 making the heating station more efficient by raising the humidity in the heating station. Experiments have shown that the steam increases the heat transfer and thereby the efficiency of the oven 14 by as mush as 25-30%, in other words a significant increase.

The temperature of the oven 14 should be high enough to properly heat the toddy, but low enough so as not to burn it. The actual operating temperature chosen depends on the toddy and the general construction of the oven. The oven 14 is, in one embodiment, arranged to operate at temperatures of 95 to 100 C. Also, the time that the toddy is heated in the oven, or in other words the amount of heating required for dissolving or melting the sugar properly, depends on the quality of the sugar. High quality sugar dissolves more easily and a shorter time in the oven 14 is needed. In one embodiment the arrangement 2 is adapted so that the toddy 11 spends 15 (for high quality sugar) to 75 minutes (for low quality sugar) in the oven 14.

The use of the mesh belt 12 is essential to the process and the arrangement 2 as it allows for a continuous operation where the toddy is both heated and filtered (through the gravity pulling the solution through the mesh belt 12) at the same time. This furthermore saves on construction costs of the arrangement as one less station need to be implemented. It is furthermore easier to operate and saves on operating costs as the transport from the melting to the filtering/sieving is no longer required.

By adapting the mesh size of the mesh belt 12, the level of filtration can be controlled. A finer mesh gives a higher degree of filtration cleaning of the toddy providing a higher quality end product, but also requires a more efficient or longer heating and/or filtration.

Figure 3:
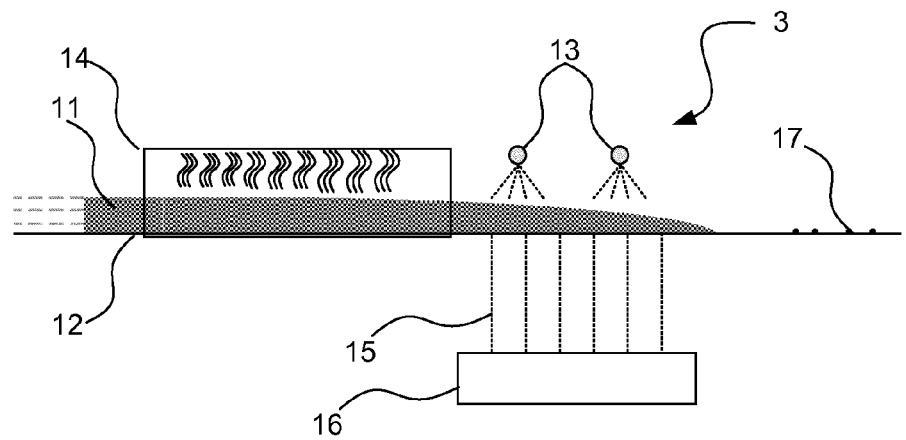
FIG. 3 shows a schematic view of an alternative arrangement for a general process according to an embodiment of the teachings herein.

FIG. 3 shows a schematic view of an alternative arrangement 3 for a general process according to an embodiment of the teachings herein. The arrangement 3 of FIG. 3 is similar to the arrangement 2 of FIG. 2, except that the steam dispensers 13 are located after the oven 14. One benefit of the arrangement in FIG. 3 is that the steam dispensers 13, or alternatively water dispensers, act to flush out the sugar content from the impurities 17.

Figure 5:
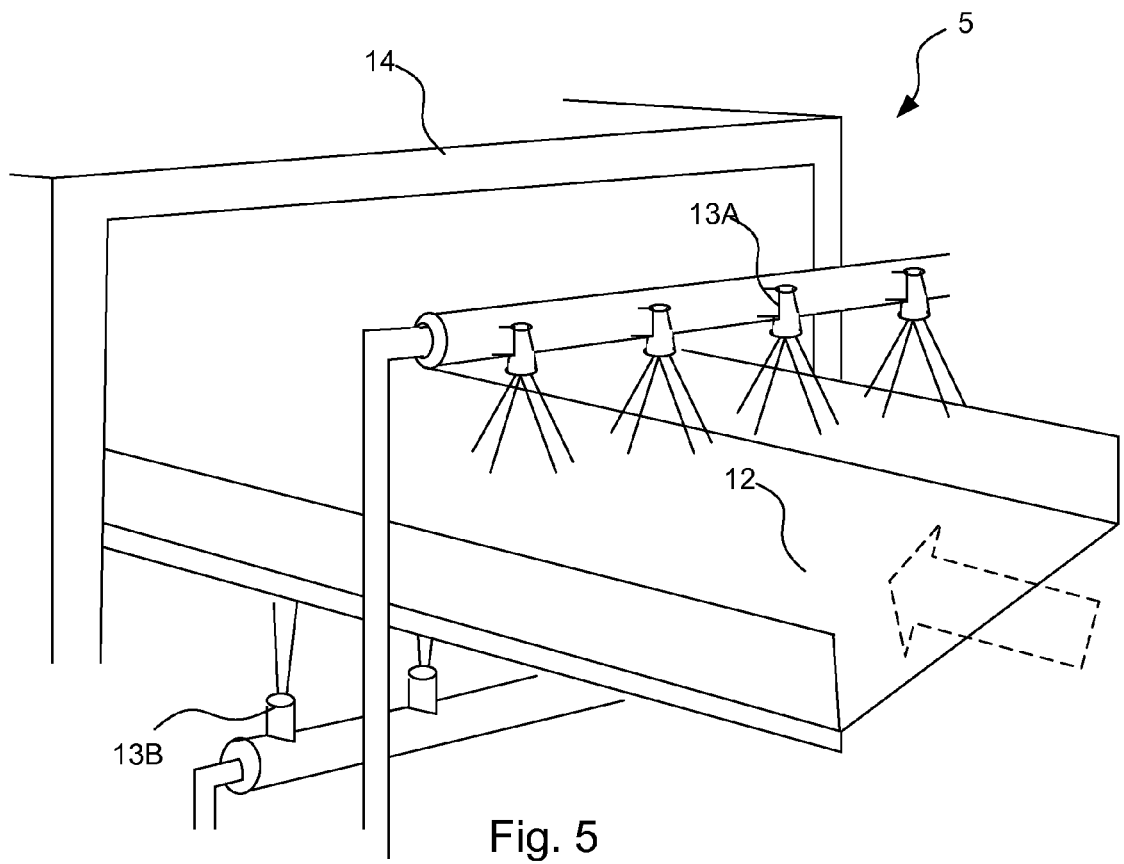
FIG. 5 shows a schematic view of an alternative arrangement for a general process according to an embodiment of the teachings herein.

FIG. 5 shows a schematic view of an alternative arrangement 5 for a general process according to an embodiment of the teachings herein. The arrangement 5 of FIG. 5 is similar to the arrangement 2 of FIG. 2, except that the steam dispensers 13 are located both above the toddy 11 and the mesh belt 12 (dispensers 13A) as well as below the mesh belt 12 (dispensers 13B). The direction of the mesh belt 12 is indicated by the dashed arrow in FIG. 5. As the mesh belt has a mesh structure it efficiently allows for heating from the underside as well. In one embodiment the oven 14 is also arranged to heat from an underside.

One benefit of the teachings herein is that the process for melting and cleansing the sugar is combined into one step and that can be performed continuously and is thus better suited for automation. An arrangement and a process according to herein furthermore saves on both installation and operations costs.

Furthermore, certain aspects of the teachings herein provide for an improved manner of heating the toddy efficiently and for achieving a desired brix count.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A process for purifying a palm sap toddy, said method comprising:
    receiving said palm sap toddy and placing it on a mesh belt that includes mesh;
    transporting said palm sap toddy through a heating station to melt said palm sap toddy; and
    separating through the mesh of said mesh belt, said melted palm sap toddy from impurities in said melted palm sap toddy.

2. A process according to claim 1, wherein said heating and said separating are performed substantially simultaneously.

3. A process according to claim 1, wherein said heating and said separating are performed continuously.

4. A process according to claim 1, wherein said palm sap toddy is a coconut palm sap toddy.

5. A process according to claim 4, wherein said heating and said separating are performed substantially simultaneously.

6. A process according to claim 4, wherein said heating and said separating are performed continuously.

* * * * *